US008878492B2

(12) United States Patent
Furukawa et al.

(10) Patent No.: US 8,878,492 B2
(45) Date of Patent: Nov. 4, 2014

(54) POWER SOURCE APPARATUS, VEHICLE AND POWER STORAGE SYSTEM USING THE POWER SOURCE APPARATUS

(75) Inventors: Kimihiko Furukawa, Kakogawa (JP); Junya Yano, Kasai (JP); Kuniho Tanaka, Kasai (JP)

(73) Assignee: Sanyo Electric Co., Ltd., Osaka (JP)

( * ) Notice: Subject to any disclaimer, the term of this patent is extended or adjusted under 35 U.S.C. 154(b) by 261 days.

(21) Appl. No.: 13/583,405

(22) PCT Filed: Oct. 13, 2011

(86) PCT No.: PCT/JP2011/073585
§ 371 (c)(1),
(2), (4) Date: Sep. 7, 2012

(87) PCT Pub. No.: WO2012/053426
PCT Pub. Date: Apr. 26, 2012

(65) Prior Publication Data
US 2013/0002016 A1 Jan. 3, 2013

(30) Foreign Application Priority Data
Oct. 19, 2010 (JP) .................................. 2010-234976

(51) Int. Cl.
*H02J 7/00* (2006.01)
*B60L 11/18* (2006.01)
*H01M 10/48* (2006.01)
*H02J 7/14* (2006.01)
*H01M 10/42* (2006.01)
*H02J 7/35* (2006.01)

(52) U.S. Cl.
CPC .............. *H02J 7/0016* (2013.01); *Y02T 10/705* (2013.01); *B60L 2240/549* (2013.01); *B60L 11/187* (2013.01); *H01M 2010/4278* (2013.01); *B60L 2240/547* (2013.01); *B60L 11/1861* (2013.01); *B60L 11/1879* (2013.01); *Y02T 90/16* (2013.01); *H02J 7/35* (2013.01); *H01M 10/425* (2013.01); *H01M 2220/20* (2013.01); *H01M 10/48* (2013.01); *Y02T 10/7055* (2013.01); *B60L 2240/545* (2013.01); *Y02T 10/7044* (2013.01); *Y02T 10/7005* (2013.01); *H02J 7/1423* (2013.01)
USPC .............................. 320/116; 320/137; 307/48

(58) Field of Classification Search
CPC ....................................................... H02J 7/0021
USPC ............................ 320/116, 137; 307/48, 901
See application file for complete search history.

(56) References Cited

U.S. PATENT DOCUMENTS 5,932,932 A * 8/1999 Agatsuma et al. ........... 307/10.6
6,262,561 B1 7/2001 Takahashi et al.
(Continued)

FOREIGN PATENT DOCUMENTS

EP 0 932 240 7/1999
EP 1 289 096 3/2003
(Continued)

OTHER PUBLICATIONS
International Search Report issued Dec. 27, 2011 in International (PCT) Application No. PCT/JP2011/073585.
(Continued)

*Primary Examiner* — Yalkew Fantu
(74) *Attorney, Agent, or Firm* — Wenderoth, Lind & Ponack, LLP

(57) ABSTRACT

The power source apparatus is provided with a plurality of modules (10), and a main controller (2) connected with communication interface units (16) in each module via a communication line CB. Each module is provided with a battery block (12) having a plurality of battery cells (11) stacked together and connected in series and/or parallel, a battery state detection section (14) to detect the state of the battery cells, communication interface units for data communication with other modules and the main controller, and a memory section (18) that can store data received through the communication interface units. The plurality of modules are connected in series and/or parallel with an output line OL.

13 Claims, 11 Drawing Sheets

(56) References Cited

U.S. PATENT DOCUMENTS

| | | | |
|---|---|---|---|
| 2001/0000423 A1* | 4/2001 | Fischer et al. | 320/114 |
| 2003/0044689 A1 | 3/2003 | Miyazaki et al. | |
| 2003/0117112 A1* | 6/2003 | Chen et al. | 320/137 |
| 2004/0164706 A1 | 8/2004 | Osborne | |
| 2004/0178768 A1 | 9/2004 | Miyazaki et al. | |
| 2005/0035741 A1* | 2/2005 | Elder et al. | 320/116 |
| 2005/0242775 A1 | 11/2005 | Miyazaki et al. | |
| 2007/0018613 A1 | 1/2007 | Miyazaki et al. | |
| 2007/0145954 A1 | 6/2007 | Kawahara et al. | |
| 2008/0061740 A1 | 3/2008 | Miyazaki et al. | |
| 2008/0067978 A1 | 3/2008 | Miyazaki et al. | |
| 2008/0079395 A1 | 4/2008 | Miyazaki et al. | |
| 2008/0091364 A1* | 4/2008 | Lim et al. | 702/63 |
| 2009/0087722 A1 | 4/2009 | Sakabe et al. | |
| 2009/0169987 A1 | 7/2009 | Miyazaki et al. | |
| 2009/0174369 A1 | 7/2009 | Kawahara et al. | |
| 2009/0261781 A1 | 10/2009 | Miyazaki et al. | |
| 2009/0284223 A1 | 11/2009 | Miyazaki et al. | |
| 2009/0284224 A1 | 11/2009 | Miyazaki et al. | |
| 2009/0302802 A1 | 12/2009 | Miyazaki et al. | |
| 2010/0001737 A1 | 1/2010 | Kubo et al. | |
| 2010/0097033 A1* | 4/2010 | Tange | 320/116 |
| 2012/0139491 A1* | 6/2012 | Eberhard et al. | 320/118 |
| 2012/0286734 A1 | 11/2012 | Miyazaki et al. | |

FOREIGN PATENT DOCUMENTS

| | | |
|---|---|---|
| EP | 1 798 100 | 6/2007 |
| EP | 2 043 222 | 4/2009 |
| EP | 2 141 782 | 1/2010 |
| JP | 2003-047111 | 2/2003 |
| WO | 02/080332 | 10/2002 |
| WO | 2011/132434 | 10/2011 |
| WO | 2011/135868 | 11/2011 |
| WO | 2012/029317 | 3/2012 |

OTHER PUBLICATIONS

International Preliminary Report on Patentability issued May 15, 2012 in International (PCT) Application No. PCT/JP2011/073585.

Extended European Search Report issued Jul. 31, 2014 in corresponding European patent application No. 11 83 4266.

* cited by examiner

POWER SOURCE APPARATUS, VEHICLE AND POWER STORAGE SYSTEM USING THE POWER SOURCE APPARATUS

FIELD

The present invention relates to a power source apparatus provided with a plurality of battery cells, to a vehicle and power storage system using the power source apparatus, and in particular to a power source apparatus optimized as the power source carried on-board an electric powered vehicle such as a hybrid (electric) vehicle or electric vehicle to supply power to the motor that drives the vehicle.

BACKGROUND

A power source apparatus has many battery cells connected in series to increase output voltage and increase the output power. Further, to attain a high charge capacity per unit volume, a power source apparatus has been developed with battery stacks having many rectangular batteries stacked together. Battery stacks can be configured as modules, and by connecting a plurality of battery modules in series and/or parallel, power source apparatus structure can be adapted for output that meets different current and voltage specifications.

In addition, by providing a circuit board for each battery module, parameters such as battery module capacity, voltage, and battery cell temperature can be monitored and controlled for each battery module. This type of power source apparatus configured with functional modules or intelligent modules has been proposed (patent reference 1).

CITATION LIST

Patent Literature

Patent Literature 1: Japanese Laid-Open Patent Publication 2003-47111

SUMMARY OF INVENTION

Technical Problem

However, although a high level of monitor and control capability is achieved by providing each battery module with control circuitry such as a microcomputer, complex electronic circuitry must be disposed in each battery module, circuit structure becomes extremely complex, and associated data processing becomes demanding. Accordingly, this power source apparatus has the drawback that manufacturing cost as well as supporting monitor and control processing cost is extreme. This is particularly at odds with strong demand for cost reduction and simple inexpensive structure for a power source apparatus manufactured in quantity for automotive applications.

The present invention was developed considering these types of prior art drawbacks. Thus, it is a primary object of the present invention to provide a power source apparatus, vehicle and power storage system using the power source apparatus that simplifies module structure and allows centralized control.

Solution to Problem and Advantageous Effects of Invention

To achieve the object above, the power source apparatus for the first aspect of the present invention comprises a plurality of modules 10, and a main controller 2 connected with the plurality of modules 10 to control those modules 10. Each module 10 comprises a battery block 12 having a plurality of battery cells 11 stacked together and connected in series and/or parallel, a battery state detection section 14 that detects the state of the battery cells 11, and communication interface units 16 for data communication with other modules 10 and the main controller 2. The main controller 2 is connected to the communication interface units 16 of the modules 10 via communication lines CB, and the plurality of modules 10 can be connected in series and/or parallel with an output line OL. This allows computation functions to be moved from the individual modules to the main controller centralizing computation and simplifying the overall structure. In addition, manufacturing cost can be reduced by making the hardware structure common to all the modules. Further, in the event of malfunction in one or more modules, only the malfunctioning modules need to be replaced, which is beneficial from a maintenance viewpoint.

In the power source apparatus for the second aspect of the present invention, each module 10 can be provided with a memory section 18 that can store data transmitted through the communication interface units 16. This allows communication that utilizes the memory section in each module.

In the power source apparatus for the third aspect of the present invention, each module 10 can be configured to enable the memory section 18 to be over-written based on signals from the main controller 2. This allows essential information to be sent from the main controller to each module and to be stored in each module. Accordingly, this makes it possible for the main controller to monitor and control the modules in a unified manner, allows module processing to be simplified, and reduces the computational load on each module.

In the power source apparatus for the fourth aspect of the present invention, the modules 10 can be connected in series with the output line OL, and the power source apparatus can be provided with a current detection section 4 to detect output current flowing through the output line OL. Since output current flowing through the series-connected modules can be detected by a common current detection section, there is no need to provide current sensors in each module allowing the modules to be further simplified.

In the power source apparatus for the fifth aspect of the present invention, the main controller 2 and plurality of modules 10 can be connected via communication lines CB in any of the network topologies including a bus topology, daisy-chain topology, ring topology, or star topology. This allows selection of optimal module network topology depending on the application.

In the power source apparatus for the sixth aspect of the present invention, each module 10 can be provided with a plurality of communication interface units 16. One communication interface unit 16A can be connected with a module 10 on the upstream-side, and another communication interface unit 16B can be connected with a module 10 on the downstream-side. This allows adjacent modules to be easily interconnected, and achieves the positive feature of simplified layout. In particular, by reducing the length of wiring to interconnect adjacent modules, it serves as an effective noise reduction strategy.

In the power source apparatus for the seventh aspect of the present invention, each module 10 can be provided with an equalizing circuit 13 to equalize the remaining capacities of the plurality of battery cells 11 that make up the battery block 12 included in the module 10. A module 10 can receive instruction from the main controller 2 to equalize battery cell 11 remaining capacity using the equalizing circuit 13. By providing an equalizing circuit in each module and maintaining equalized cell capacities by central control via the main controller, former cell capacity balance can be maintained while reducing module-side processing overhead and simplifying systems in each module.

In the power source apparatus for the eighth aspect of the present invention, the battery state detection section 14 can be provided with a voltage detection section 21 to detect battery cell 11 voltage. This allows battery cell voltage to be monitored by each module.

In the power source apparatus for the ninth aspect of the present invention, the battery state detection section 14 can be provided with a temperature detection section 22 to detect battery cell 11 temperature. This allows battery cell temperature to be monitored by each module.

In the power source apparatus for the tenth aspect of the present invention, each module 10 can be configured to allow transmission of information related to the voltage of battery cells 11 in that module 10 to the main controller 2 via the communication interface units 16. This allows unified monitoring of the battery cell voltages in each module at the main controller.

In the power source apparatus for the eleventh aspect of the present invention, the main controller 2 can detect connection of each module 10 to communication lines CB and allocate a unique address to each module 10. The unique address allocated to each module 10 can be stored in that module's 10 memory section 18, and the system can be configured to allow data communication between the main controller 2 and each module 10 based on the unique address stored in each memory section 18. This allows each module to have a unique address, and allows main controller data communication via communication lines based on the unique addresses. In particular, since unique addresses are allocated automatically, required operations can be reduced. Further, since module addresses do not need to be pre-assigned and fixed at the time of manufacture, common modules can be produced to reduce manufacturing cost.

A vehicle using the power source apparatus for the twelfth aspect of the present invention can be equipped with any of the power source apparatus cited above.

A power storage system for the thirteenth aspect of the present invention can use any of the power source apparatus cited above.

DESCRIPTION OF EMBODIMENTS

The following describes embodiments of the present invention based on the figures. However, the following embodiments are merely specific examples of a power source apparatus, vehicle and power storage system using the power source apparatus representative of the technology associated with the present invention, and the power source apparatus, vehicle and power storage system using the power source apparatus of the present invention are not limited to the embodiments described below. Further, components cited in the claims are in no way limited to the components indicated in the embodiments. In particular, in the absence of specific annotation, structural component features described in the embodiment such as dimensions, raw material, shape, and relative position are simply for the purpose of explicative example and are in no way intended to limit the scope of the invention. Properties such as the size and spatial relation of components shown in the figures may be exaggerated for the purpose of clear explanation. In the descriptions following, components with the same name and label indicate components that are the same or have the same properties and their detailed description is appropriately abbreviated. Further, a single component can serve multiple functions and a plurality of structural elements of the invention can be implemented with the same component. In contrast, the functions of a single component can be divided among a plurality of components. In addition, explanations used to describe part of one embodiment can be used in other embodiments and descriptions. In the present application, the terms "upstream" and "downstream" are applied to modules connected via communication lines. When the module on one side of a node is referred to as "upstream," the module on the other side of that node is "downstream." Similarly, when a plurality of modules is connected in series and a module connected on one side of a given module is referred to as "upstream," a module connected on the other side of the given module is "downstream." It is also possible to define "upstream" as locations close to the main controller and "downstream" as locations far from the main controller.

(First Embodiment)

Figure 1:
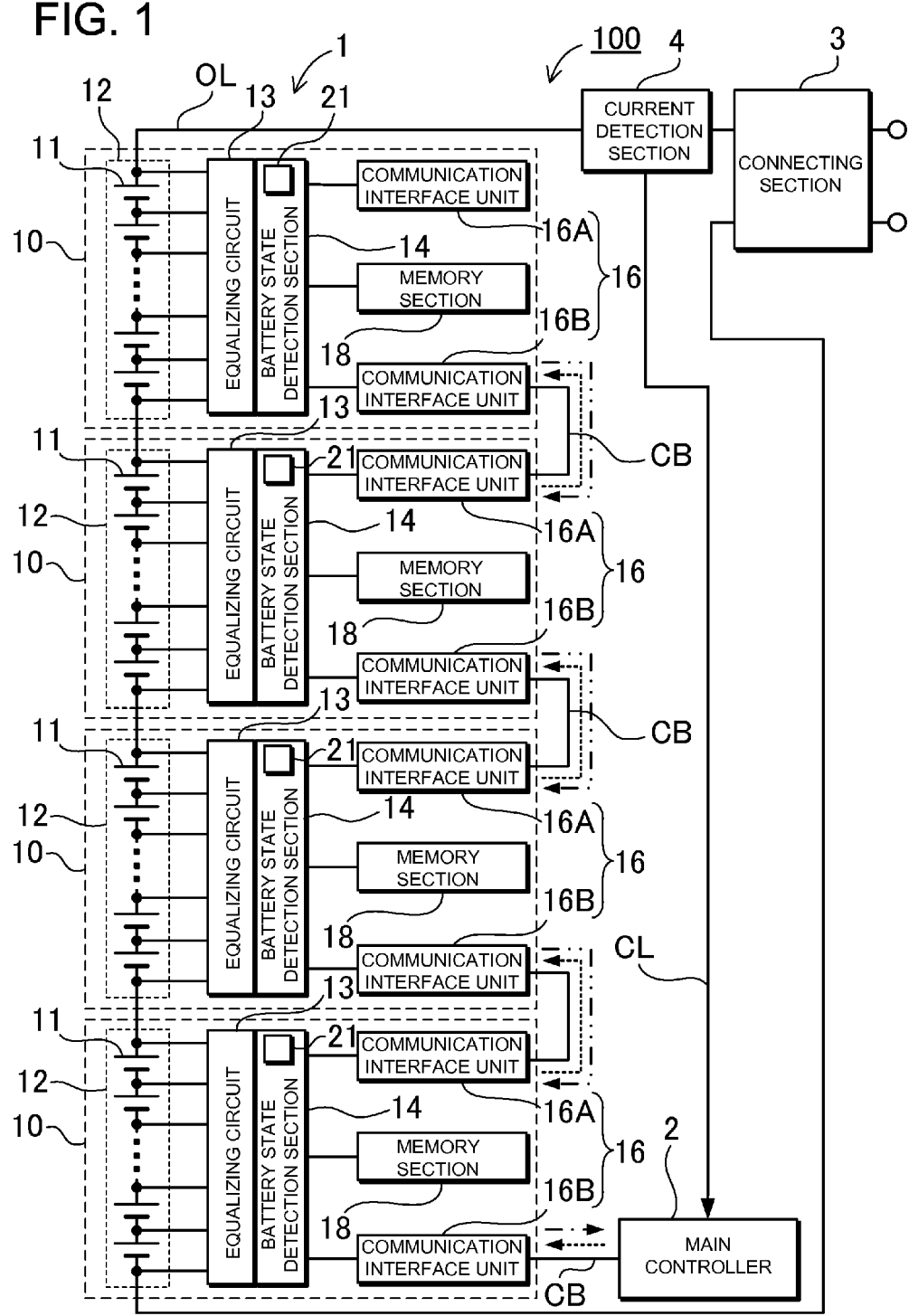
FIG. 1 is a block diagram showing a power source apparatus for the first embodiment of the present invention.

FIG. 1 shows a power source apparatus 100 for the first embodiment of the present invention. This power source apparatus 100 is a battery array system employing a plurality of battery cells, and is used as a power source carried in a vehicle such as a hybrid or electric vehicle to supply power to the motor that drives the vehicle. However, the power source apparatus of the present invention is not limited to automotive applications and can also be used appropriately as a power source apparatus in other applications demanding high output. The power source apparatus shown in this figure is provided with a plurality of modules 10, a main controller 2, a connecting section 3, and a current detection section 4.

(Module 10)

Each module 10 is provided with a battery block 12 that has individual battery cells 11 stacked together, a battery state detection section 14 that detects the state of the battery cells 11, communication interface units 16 for data communication with other modules 10 and the main controller 2, and a memory section 18. Data communication is performed between modules 10 and with the main controller 2 via the communication lines CB and the communication interface units 16. The communication lines CB are wires that allow transmissions in both directions.

(Communication Interface Unit 16)

Communication interface units 16 are capable of performing data communication, and connect adjacent modules 10 via communication lines CB. The modules 10 shown in FIG. 1 are provided with two communication interface units 16, the communication interface unit 16A on one side connects with an upstream module 10, and the communication interface unit 16B on the other side connects with a downstream module 10. This arrangement allows the communication lines CB connecting adjacent modules 10 to be made short, and limits the possibility of noise affecting the communication lines CB. Further, in this example, the modules are connected in a daisy-chain network topology. Specifically, the communication interface unit 16B at one end of the plurality of connected modules 10 is connected to the main controller 2, and the communication interface unit 16A at the other end has no connection.

(Communication Interface Unit 16 Connection and Network Topology)

However, network topology is not limited to a daisy-chain topology. For example, the power source apparatus 200 for the second embodiment shown in FIG. 2 connects the modules 10 to the main controller 2 in a ring network topology. Specifically, the communication interface unit 16B at one end of the plurality of connected modules 10 is connected to the main controller 2, and the communication interface unit 16A at the other end is also connected to the main controller 2. In this case, the communication lines CB do not have to be wires allowing two-way transmissions, and since one-way communication is sufficient, this arrangement has the positive feature that communication lines CB and communication interface units 16 can be simplified.

Figure 3:
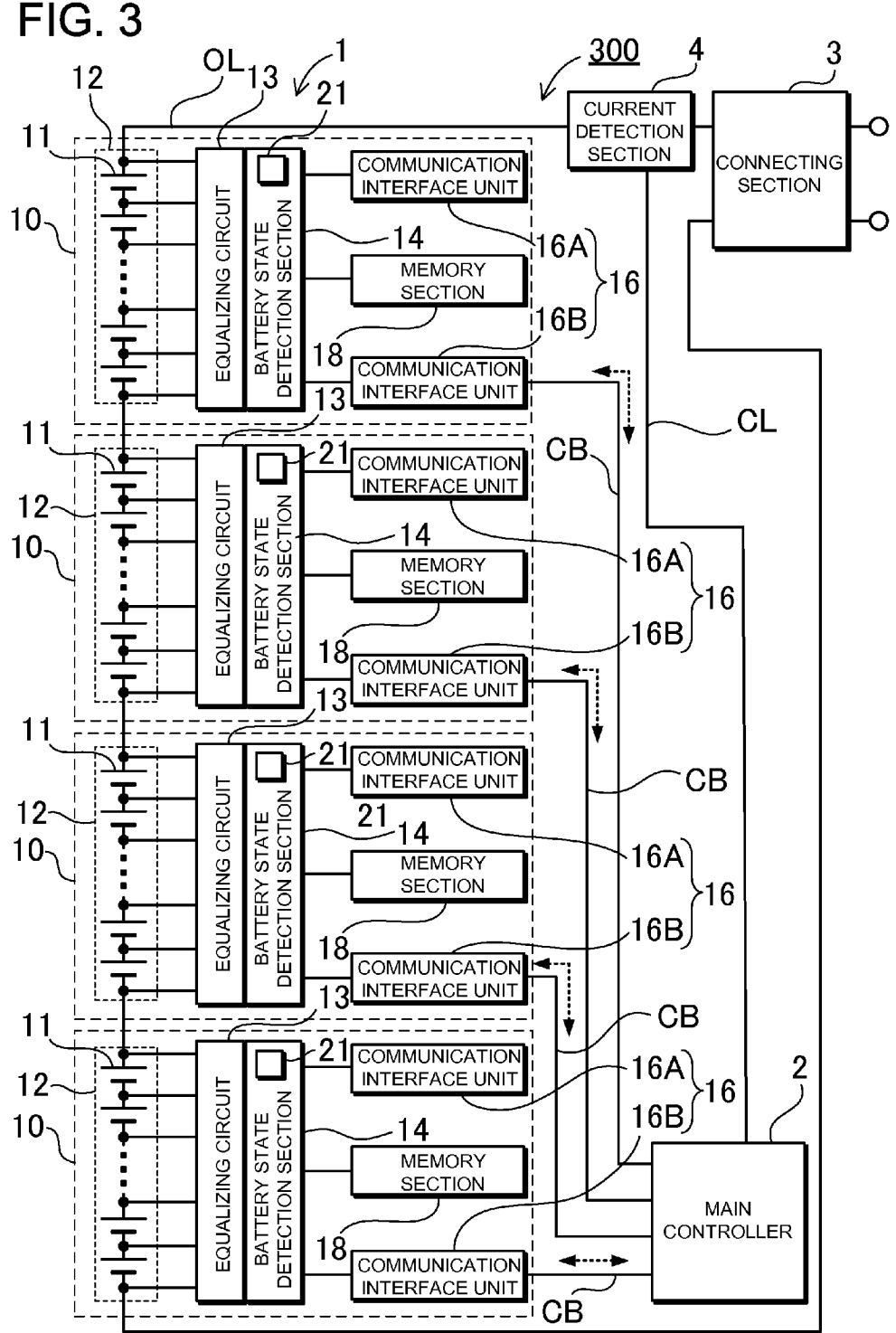
FIG. 3 is a block diagram showing a power source apparatus for the third embodiment of the present invention.

As shown in the power source apparatus 300 for the third embodiment in FIG. 3, each module 10 can be connected to the main controller 2 by an individual communication line CB in a star network topology. Since each module 10 is individually connected to the main controller 2, this topology allows interference between data communications to be eliminated and makes it unnecessary to include destination information in the data packet. This topology also has the advantage that even if a communication line CB becomes open circuited, communication with other modules 10 is maintained. In the example of FIG. 3, dual communication interface units 16 are not necessarily required and one communication interface unit 16 will suffice. Here, only communication interface units 16B are connected with communication lines CB and communication interface units 16A have no connection. Accordingly, this topology also has the positive feature that the number of communication interface units can be reduced.

Figure 4:
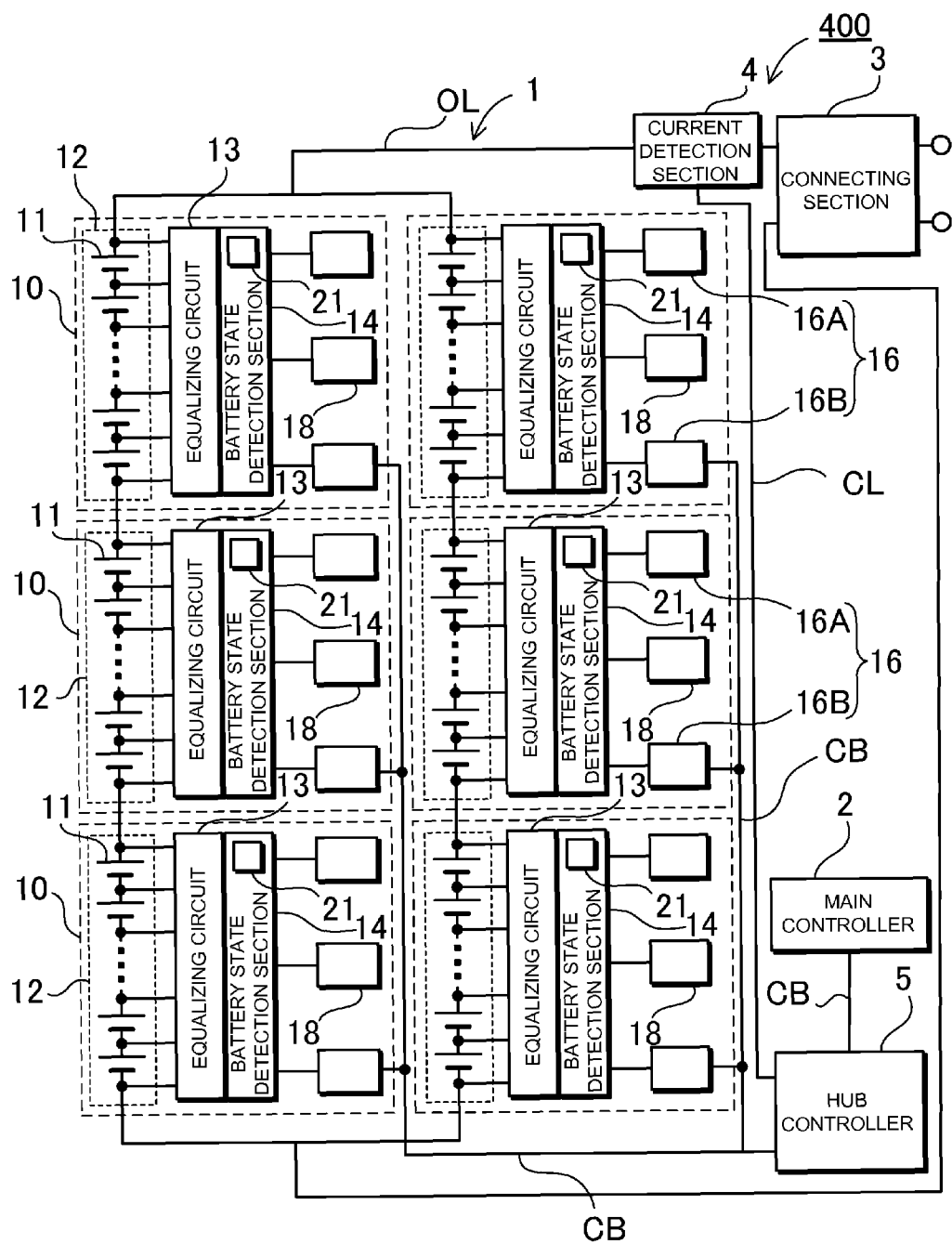
FIG. 4 is a block diagram showing a power source apparatus for the fourth embodiment of the present invention.

In the example of FIG. 3, the main controller 2 is directly connected to each module 10 by a communication line CB. However, when there are a large number of modules and, for example, a plurality of module assemblies 1, which have modules connected in series, are connected in parallel, a network topology can be used that makes connection via a hub. An example of employing such hub is shown by the fourth embodiment in FIG. 4. The power source apparatus 400 shown in this figure has a hub controller 5 disposed between the main controller 2 and the module assemblies 1. The hub controller 5 connects to each module 10 by a plurality of communication lines CB in a star topology. By connecting the hub controller 5 to the main controller 2, structured communication can be performed over the plurality of communication lines CB. It should be noted that FIG. 4 illustrates single module assemblies 1 for ease of explanation, multiple module assemblies can be also applicable to the present invention.

Figure 5:
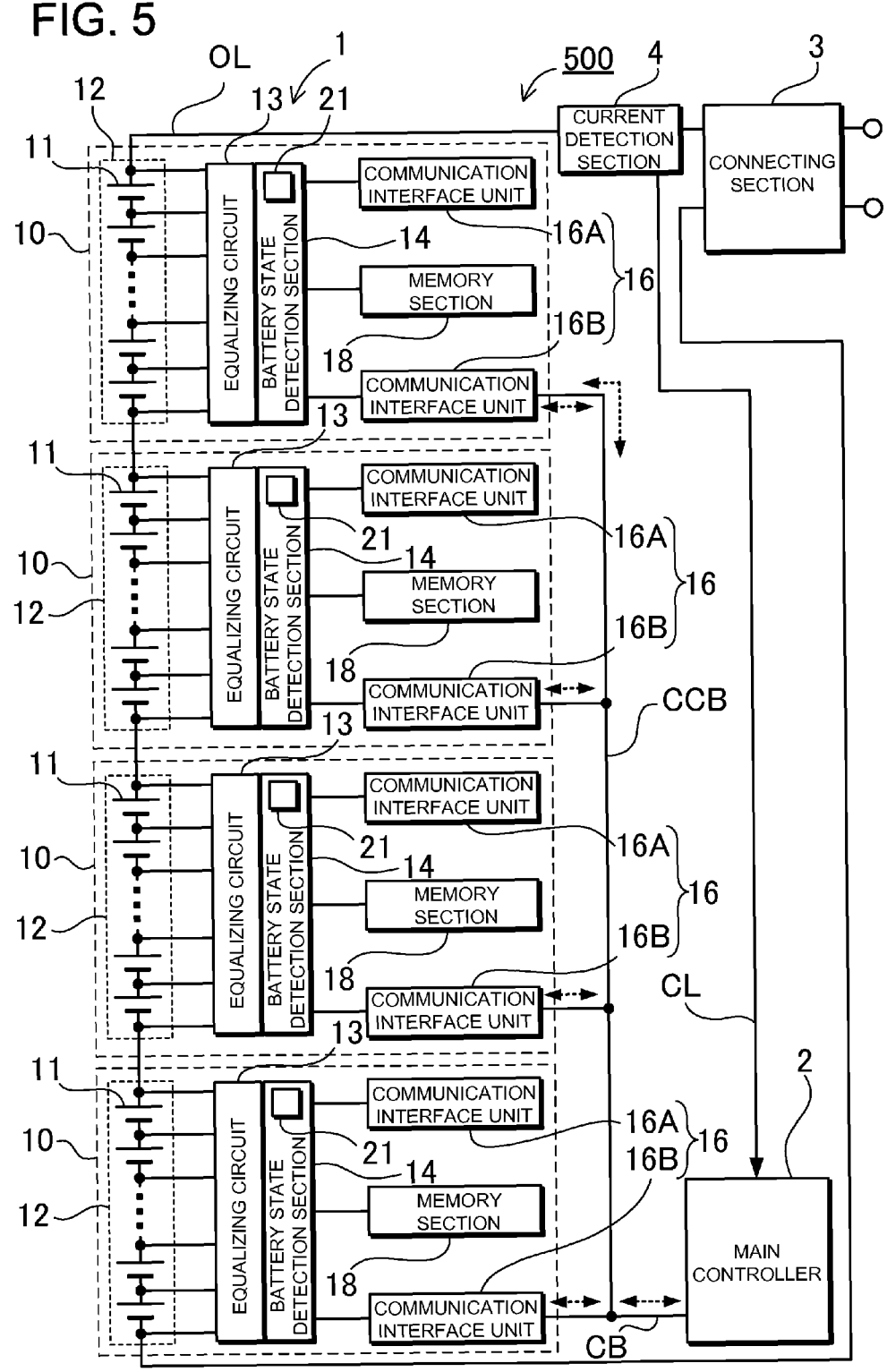
FIG. 5 is a block diagram showing a power source apparatus for the fifth embodiment of the present invention.

As shown in the power source apparatus 500 for the fifth embodiment in FIG. 5, each module 10 can be separately connected to a common communication line COB. In this example, the bus-line branches to connect with modules 10 at intervals along the common communication line COB. In this type of bus network topology, modules 10 can be successively added to the common communication line COB. In addition, the common communication line COB can be configured to connect other components besides modules 10 simplifying overall communication wiring. This type of common communication line COB is a line that allows transmission in both directions.

Any of the existing communication protocols such as CAN (controller area network), LIN (local interconnect network), FlexRay, MOST (media oriented systems transport), UART (universal asynchronous receiver transmitter), SPI (serial peripheral interface), and I2C (inter-integrated circuit) can be appropriately applied for communication using the communication lines.

The modules 10 have positive and negative sides of battery blocks 12 connected with the output line OL. Modules 10 connected in series and with an output line OL make up a module assembly 1. A module assembly 1 can output the power produced by the series-connected battery blocks 12 to the outside via the connecting section 3. Accordingly, the connecting section 3 is provided with external output terminals.

Figure 2:
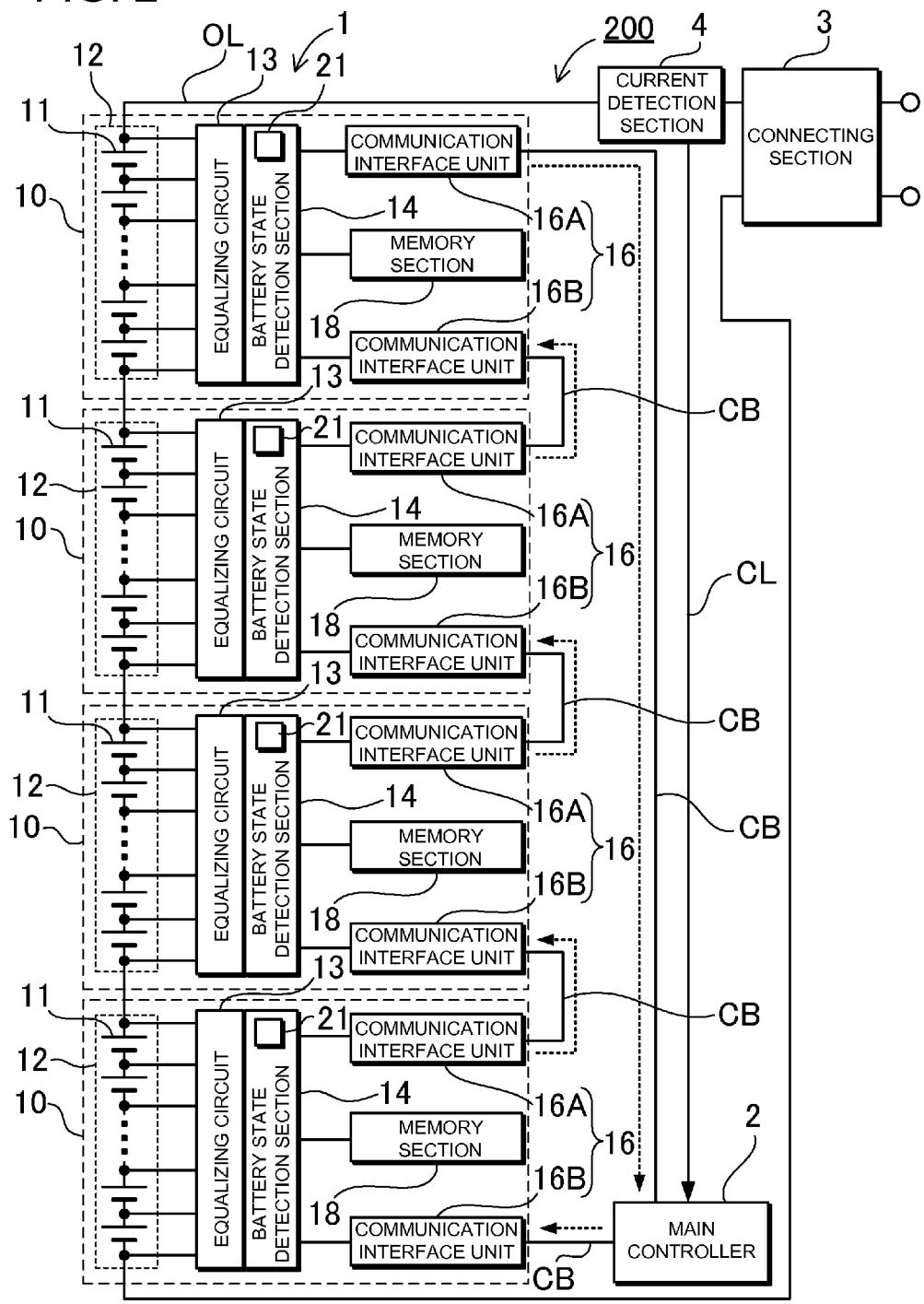
FIG. 2 is a block diagram showing a power source apparatus for the second embodiment of the present invention.

Although four modules 10 are connected in series in the examples of FIGS. 1-3, it should be clear that the number of connected modules 10 can also be three or less, or five or more. Further, it is also possible to mix series and parallel connection of the modules. Output voltage and current can be adjusted by the number and type of connection of the modules.

(Current Detection Section 4)

A current detection section 4 is provided on the output line OL, and output current flowing through the output line OL from the module assemblies 1 is detected by the current detection section 4. The current detection section 4 is also connected to the main controller 2 via a current signal line CL, which is separate from the communication line CB. Information related to output current detected by the current detection section 4 is sent to the main controller 4 over the current signal line CL. In this example, the current detection section 4 does not communicate with the main controller 2, but rather connection is made to simply input a signal representing current detected by the current detection section 4 to the main controller 2. However, it is also possible to acquire the current signal by establishing communication, and in that case, the current detection section 4 can be connected to a line such as a communication line. The main controller 2 can monitor the state of battery cells 11 in each module 10 via the communication lines CB, and can monitor the output current via the current signal line CL. Accordingly, the main controller 2 can perform functions such as transmitting battery cell 11 and output current information to externally connected devices, and issuing commands to modules 10 to disconnect battery cells 11.

In this manner, a single current detection section 4 can be disposed in the output line OL rather than in each module 10, and by connecting it with the main controller 2, a common current detection section 4 can be established. Said differently, the requirement for a current sensor in each module can be eliminated contributing to module simplification.

(Battery State Detection Section 14)

The modules 10 shown in figures such as FIG. 1 are not simply a plurality of stacked battery cells as in prior art battery modules, but rather each module 10 is provided with a circuit board 20 (see FIG. 8) carrying circuitry such as protection circuits to protect the battery block 12, which is a stack of battery cells 11. A circuit board 20 carries the battery state detection section 14, which detects battery block 12 parameters such as temperature, voltage, and current. In addition, the circuit board 20 can be provided with protection circuitry that performs circuit cut-off if a voltage abnormality develops.

(Voltage Detection Section 21)

The battery state detection section 14 is provided with a voltage detection section 21 to detect the voltages of the battery cells 11 included in the module 10. It is desirable to provide a voltage detection section 21 for each battery cell 11. Particularly in the case of lithium ion rechargeable batteries, safety can be insured by monitoring the voltage of each battery cell to accurately recognize any abnormality. However, voltage can also be detected for battery cells only at specific sites such as at each end or at the center of the battery block. The voltage detection section 21 and the communication interface units 16 are disposed in proximity with the battery cells 11. In particular, by disposing the voltage detection section 21 in proximity with the battery block 12 using a short wire harness or flexible printed circuitry, detection line short circuits can be prevented.

The voltage detection section 21 and two communication interface units 16 can also be integrated as a single chip. This allows the circuit board 20 in each module 10 to be made smaller. A memory section 18 can also be added to the voltage detection section 21 and communication interface units 16 and integrated as a single chip structure. Further, the circuit board 20 can be mounted at an end of the battery block 12.

A module 10 can send information related to battery cell 1 voltages to the main controller 2 via the communication interface units 16. This allows the main controller 2 to monitor the battery cell 1 voltages in each module 10 in a structured manner.

(Temperature Detection Section 22)

The battery state detection section 38 can also be provided with a temperature detection section 22 (see FIG. 6) to detect the temperature of battery cells 11 included in the module 10. The temperature detection section 22 is disposed only at a specific battery cell 11 in a location such as at the point of maximum battery cell 11 temperature (for example, in the center of the battery block 12 or on the coolant flow downstream side) or at the point of minimum battery cell 11 temperature (for example, at an end of the battery block 12 or on the coolant flow upstream side). However, it should also be clear that a temperature detection section could be provided at each battery cell.

(Memory Section 18)

The memory section 18 stores data communicated via the communication interface units 16. Non-volatile memory such as $E^2$PROM (electrically erasable programmable read-only memory) can be used for this type of memory section 18. Parameters such as address information to distinguish each module 10, battery capacity of the battery cells in the module (battery state-of-charge), and battery lifetime information (battery state-of-health) can be stored in the non-volatile memory. By allocating an individual address to each module 10, it is possible to distinguish each module 10 in a plurality of connected modules 10.

Data stored in a memory section 18 is capable of being over-written based on signals from the main controller 2. This allows necessary information to be sent from the main controller 2 to a module 10 and stored at that module 10. As a result, the main controller 2 can control the modules 10 in a unified manner allowing module 10 processing to be simplified and reducing the processing requirements on each module 10. For example, when individual address information to allow the main controller 2 to identify each module 10 is allocated from the main controller 2 to a module 10, that module 10 writes its own address information into the memory section 18.

(Individual Address Information)

The main controller 2 can detect each module 10 connected to the communication line CB and assign individual addresses. This allows each module 10 to have an individual address, and enables communication between the main controller 2 and the modules 10 via the communication line CB based on individual addressing. In particular, since individual addresses are set automatically, the system has the positive feature that effort to perform this operation can be reduced. Further, since individual address information does not need to be established at the time of module 10 manufacture, module 10 commonality is enhanced and manufacturing cost can be reduced.

For example, when a module 10 is connected in the power source apparatus 100, the main controller 2 detects connection, automatically sets the individual address, and sends that address information to the module 10. The module 10 can recognize the transmitted address information, write that information into its memory section 18, and begin data communication based on individual addressing. As a result, the modules 10 can acquire individual address information, and can perform addressed data communication with the main controller 2 based on the acquired address information.

In this manner by limiting the functions of the modules 10 and configuring the modules 10 with common hardware, considerable cost containment can be realized. In addition, by making a system with common modules 10, even if one or more modules 10 malfunction, only the failed modules 10 need to be replaced, which is valuable from a maintenance viewpoint.

(Battery Cell 11)

A battery block 12 is made up of a plurality of battery cells 11 connected in series and/or parallel. In the example of FIG. 1, battery cells 11 are connected in series. Lithium ion batteries are suitable for use as the battery cells 11. Lithium ion batteries have a high voltage and output voltage can be made high with a small number of series-connected batteries. However, other batteries that can be charged such as nickel hydride batteries or nickel cadmium batteries can also be used as the battery cells. The output voltage of a battery block 12 is adjusted by the number of series-connected battery cells 11. Further, the output voltage of the power source apparatus 100 is adjusted by the number of series-connected modules 10. For example, in an application that supplies power to the motor that drives a vehicle, the power source apparatus 100 has a plurality of battery blocks 12 connected in series for an output voltage of 100V to 400V, and preferably for an output voltage of 200V to 300V.

(Equalizing Circuit 13)

Each module 10 is provided with an equalizing circuit 13 to equalize the remaining capacities of the (plurality of) battery cells 11 that make up the battery block 12. Each module 10 can receive an equalization command from the main controller 2 and activate the equalizing circuit 13 to equalize the remaining capacities of the battery cells 11. The equalizing circuit 13 short circuits battery cells with high voltage or high remaining capacity through a resistor to consume excess power and equalize the capacity of those battery cells with respect to the other battery cells. Accordingly, each battery cell has a structure including a shorting circuit and the shorting circuit is controlled by a switch to perform equalization. As a result, centralized control via the main controller 2 can maintain appropriate balance between the battery cells 11 in each module 10. Specifically, this can reduce processing at the module 10 level, and can contribute to simplified module 10 structure. Depending on requirements, circuitry for battery block equalization can also be provided to maintain battery block voltage balance between modules. To achieve equalization between modules, the system can be configured to supply power from a module or modules with high battery block voltage to the other modules.

(Electric Powered Vehicle)

Figure 6:
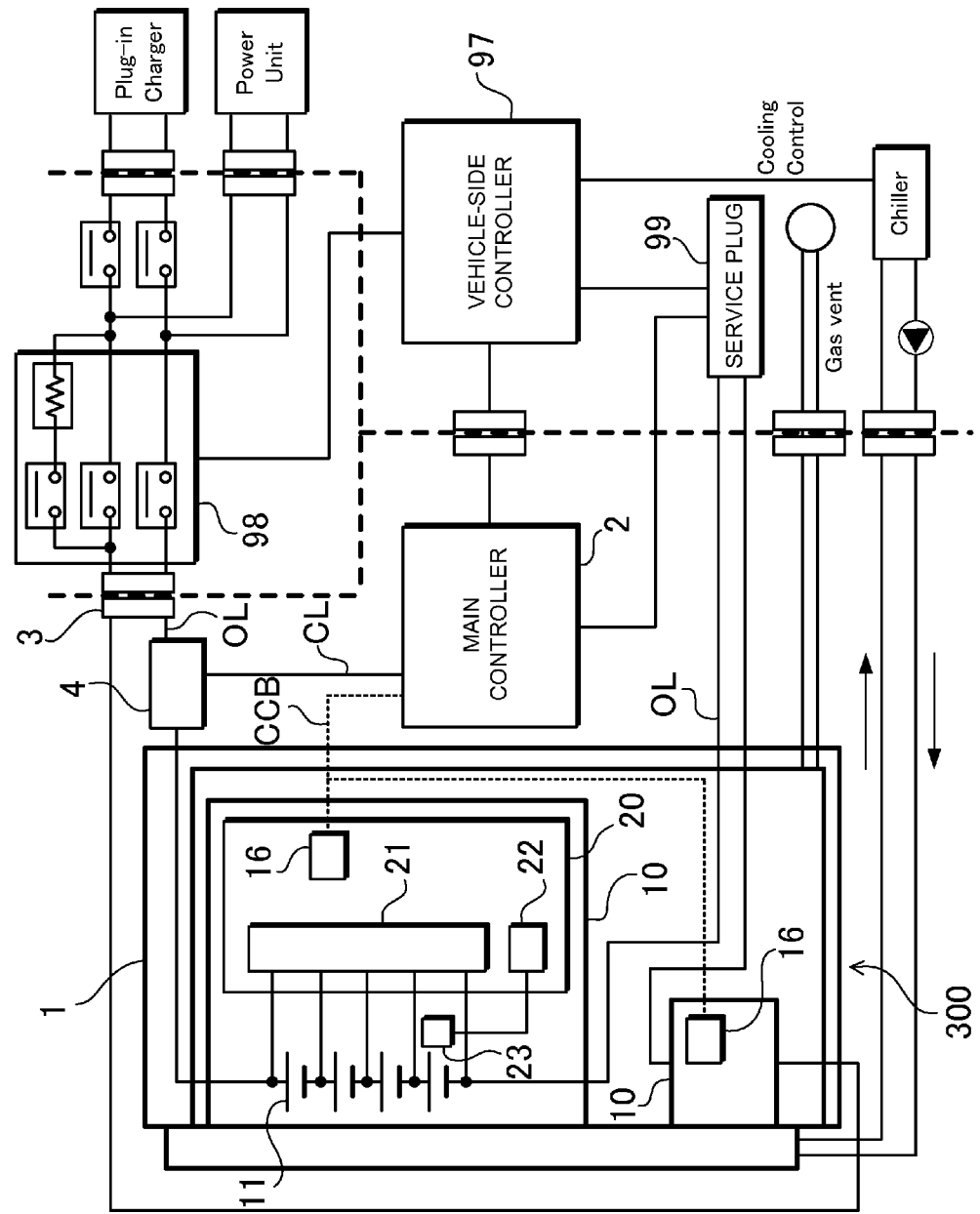
FIG. 6 is a block diagram showing power source apparatus structure in detail.

The block diagram of FIG. 6 shows an example of the power source apparatus installed in an electric powered vehicle. In the example of FIG. 6, the power source apparatus 300 is made up of two connected modules 10. Here, the current detection section 4 is connected to the main controller 2 by a special-purpose bus line that is independent from the communication line CB. The main controller 2 acts as the power source apparatus electronic control unit to detect output current, control each module 10, control transmissions on the communication line CB, and perform data communication with an externally connected vehicle-side controller 97. The main controller 2 is connected to the vehicle-side controller 97 via a low voltage connector. In contrast, the connecting section 3 connects the module assembly 1 output line OL with the vehicle-side contactor relay unit 98 via a high voltage connector. In addition, a service plug 99 is connected in the output line OL circuit to open-circuit the output line OL and insure safety during operations such as maintenance and inspection.

The circuit boards 20 of the modules 10 shown in FIG. 6 do not carry high performance computational devices such as micro-processing units. Rather, by configuring the circuit boards with only simple generic and application specific integrated circuits, a memory section 18, and an equalizing circuit 13, circuit structure is simplified and both size and cost are reduced. Meanwhile, processing that requires computational power such as battery state-of-charge and state-of-health calculations can be turned over to the main controller 2 connected via the communication line CB. Since this type of structure simplifies required module hardware specifications, the modules 10 can be manufactured inexpensively. In addition, since required processing can be performed in a structured manner by the main controller 2, essential functionality is maintained relative to prior art systems.

Data from each module 10 is accumulated at the main controller 2 where it is integrated and processed in a structured manner. The main controller 2 also recognizes each newly added module 10 when it is connected and automatically defines and distributes an individual address to that module 10. As a result, an added module 10 can conduct data communication within the power source apparatus based on its allocated individual address. (Detailed Structure of a Module 10)

Figure 7:
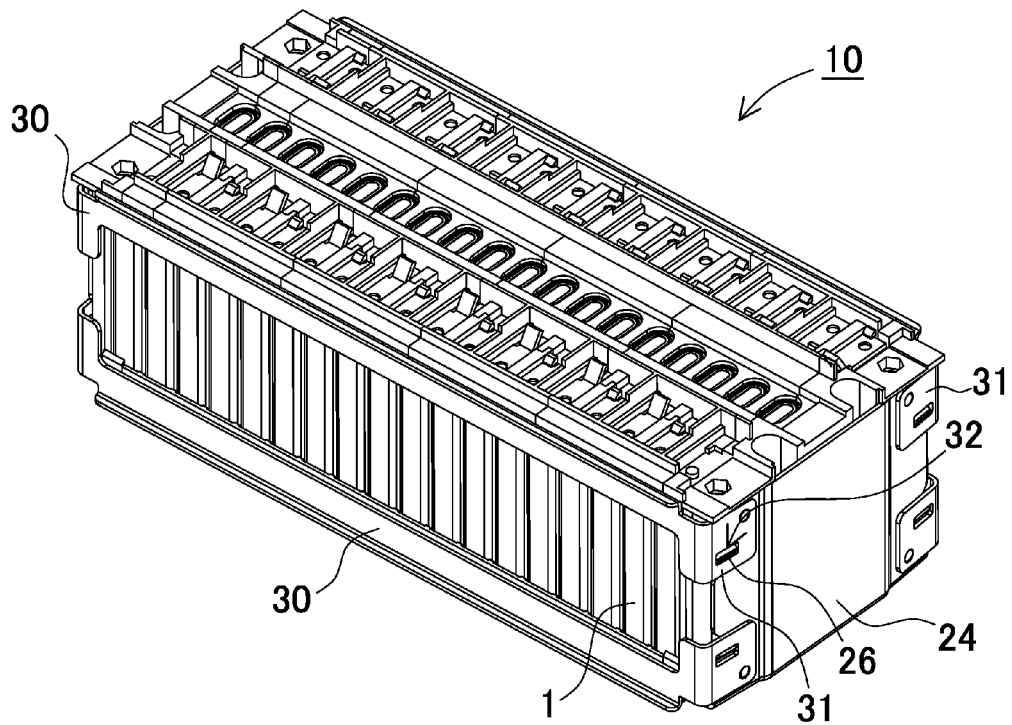
FIG. 7 is an oblique view showing the external appearance of a module.
Figure 8:
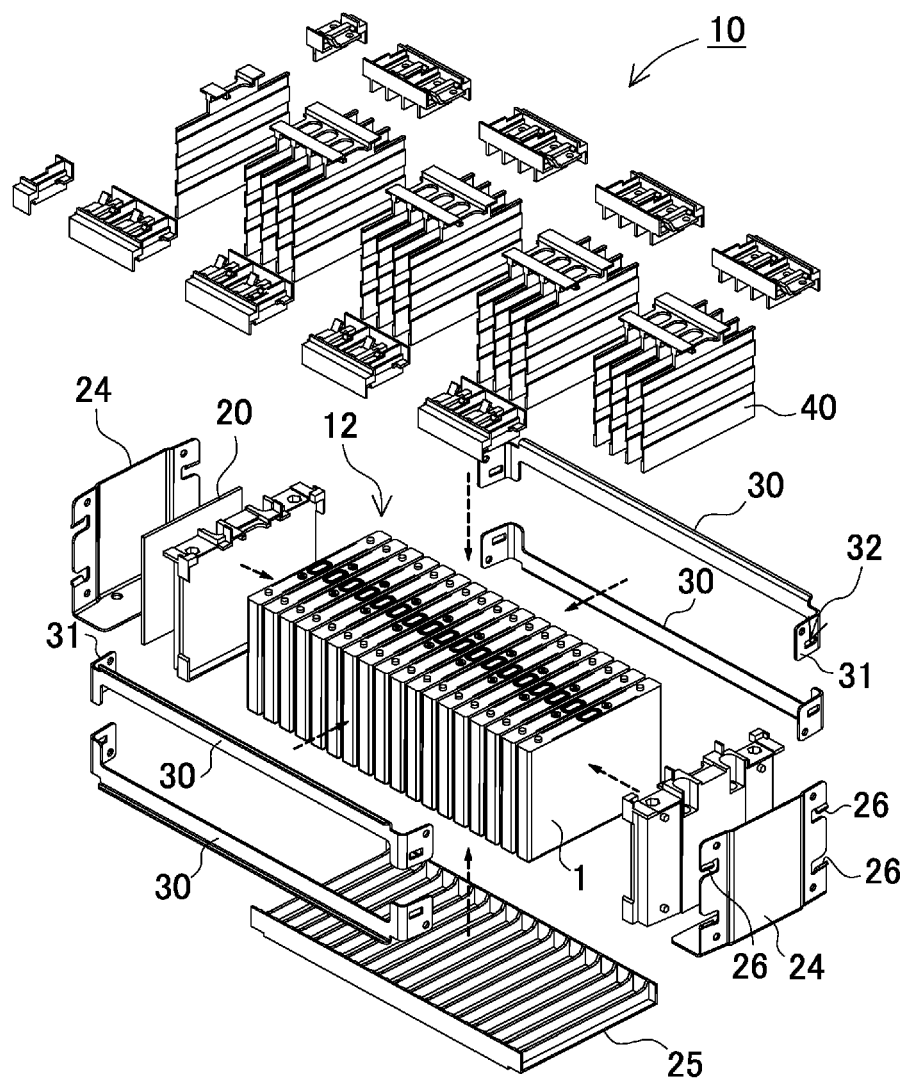
FIG. 8 is an exploded oblique view of a module.

FIG. 7 shows an oblique view of the external appearance of a module 10 and FIG. 8 shows an exploded oblique view of the module 10 in FIG. 7. The module 10 shown in these figures is provided with a battery block 12 and a circuit board 20. In this example, a plurality of rectangular battery cells 11 are stacked in the battery block 12 and bound together by binding bars 30. Further, various circuits such as protection circuits to protect battery cells 11 from abnormal conditions are mounted on the circuit board 20.

(Battery Block 12)

As shown in FIG. 7, the battery block 12 has a rectangular box shaped exterior with many rectangular battery cells 11 stacked between endplates 24 at both ends and held together by binding bars 30. As shown in the exploded oblique view of FIG. 8, the battery block 12 is made up of a plurality of rectangular battery cells 11 stacked with separators 40 intervening between battery cells 11. In the example of FIG. 8, eighteen battery cells 11 are stacked in the battery block 12. The binding bars 30 serve as fastening components that bind the battery cells 11 together. In this example, the binding bars 30 are sheet-metal bands with bent regions 31 formed at each end to give the binding bars 30 a U-shape when viewed from above. Slits 32 are opened through the bent regions 31 to engage with projections 26 established on the endplates 24. By inserting the endplate 24 projections 26 into the binding bar 30 bent region 31 slits 32, battery cells 11 are held in a stack with intervening separators 40.

(Battery Cell 11)

A battery cell 11 is made up of a rectangular external case having a width greater than its thickness, and positive and negative electrode terminals are established on a sealing plate that seals the top of the external case closed. Electrode terminals of adjacent battery cells 11 are connected via bus-bars. Battery cell external cases can be made from insulating material such as plastic. In that case, since there is no need to insulate the external cases when battery cells are stacked together, separators could be made of metal. Further, battery cell surfaces excluding the top surface could be processed to make them insulating. Specifically, battery cell surfaces excluding the top surface could be covered by insulating film.

The battery cells 11 are rectangular lithium ion rechargeable batteries. However, rechargeable batteries such as nickel hydride batteries or nickel cadmium batteries can also be used as the battery cells. A battery cell 11 has a rectangular shape of given thickness, is provided with positive and negative electrode terminals projecting from the ends of the top surface, and has a safety valve opening established at the center region of the top surface. The positive and negative electrode terminals of adjacently stacked battery cells 11 are connected by bus-bars to connect the battery cells 11 in series. A battery system that has adjacent battery cells 11 connected in series can increase its output power by increasing output voltage. However, adjacent battery cells can also be connected in parallel.

(Separators 40)

The battery block 12 has separators 40 sandwiched between the stacked battery cells 11. Plastic separators 40 can insulate metal external cases of battery cells 11 stacked in the battery block 12. Separators 40 are shaped to fit together with battery cells 11 on both sides and keep the battery cells 11 stacked in a manner that prevents adjacent battery cells 11 from shifting out of position.

As shown in FIG. 8, separators 40 establish cooling gaps between the battery cells 11 and separators 40 to pass a cooling gas such as air to cool the battery cells 11. The battery block 12 has a plurality of battery cells 11 stacked in a manner that establishes cooling gaps between the battery cells 11. The battery block 12 is also provided with a forced ventilating system (not illustrated) that forcibly ventilates the battery cells 11 with cooling gas.

(Vehicle Using the Power Source Apparatus)

Figure 9:
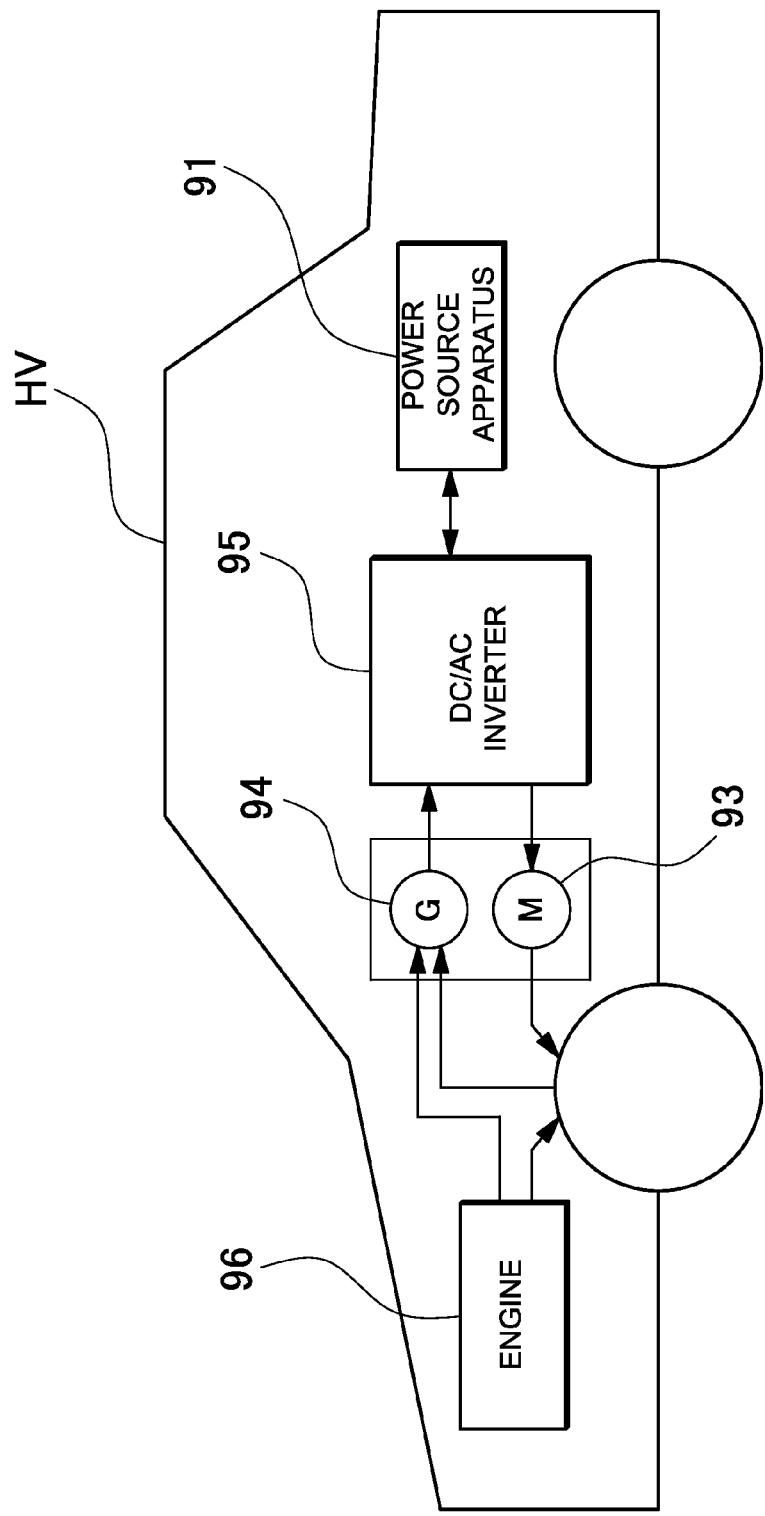
FIG. 9 is a block diagram showing an example of a hybrid vehicle, which is driven by a motor and an engine, equipped with a battery system.

Next, vehicles equipped with the power source apparatus using the battery cells described above are described based on FIGS. 9 and 10. FIG. 9 shows an example of an automotive battery system installed on-board a hybrid vehicle HV, which is driven by both an engine and an electric motor. The vehicle HV in this figure is provided with an engine 96 and a driving motor 93 to drive the vehicle, a battery system 91 to supply power to the motor 93, and a generator 94 to charge the battery system 91 batteries. The battery system 91 is connected to the motor 93 and generator 94 via a direct current/alternating current (DC/AC) inverter 95. The vehicle HV runs on both the motor 93 and engine 96 while charging the batteries in the battery system 91. In operating modes where engine efficiency is poor such as during acceleration and low speed cruise, the vehicle is driven by the motor 93. The motor 93 operates on power supplied from the battery system 91. The generator 94 is driven by the engine 96 or by regenerative braking when the vehicle brake pedal is pressed and operates to charge the battery system 91 batteries.

Figure 10:
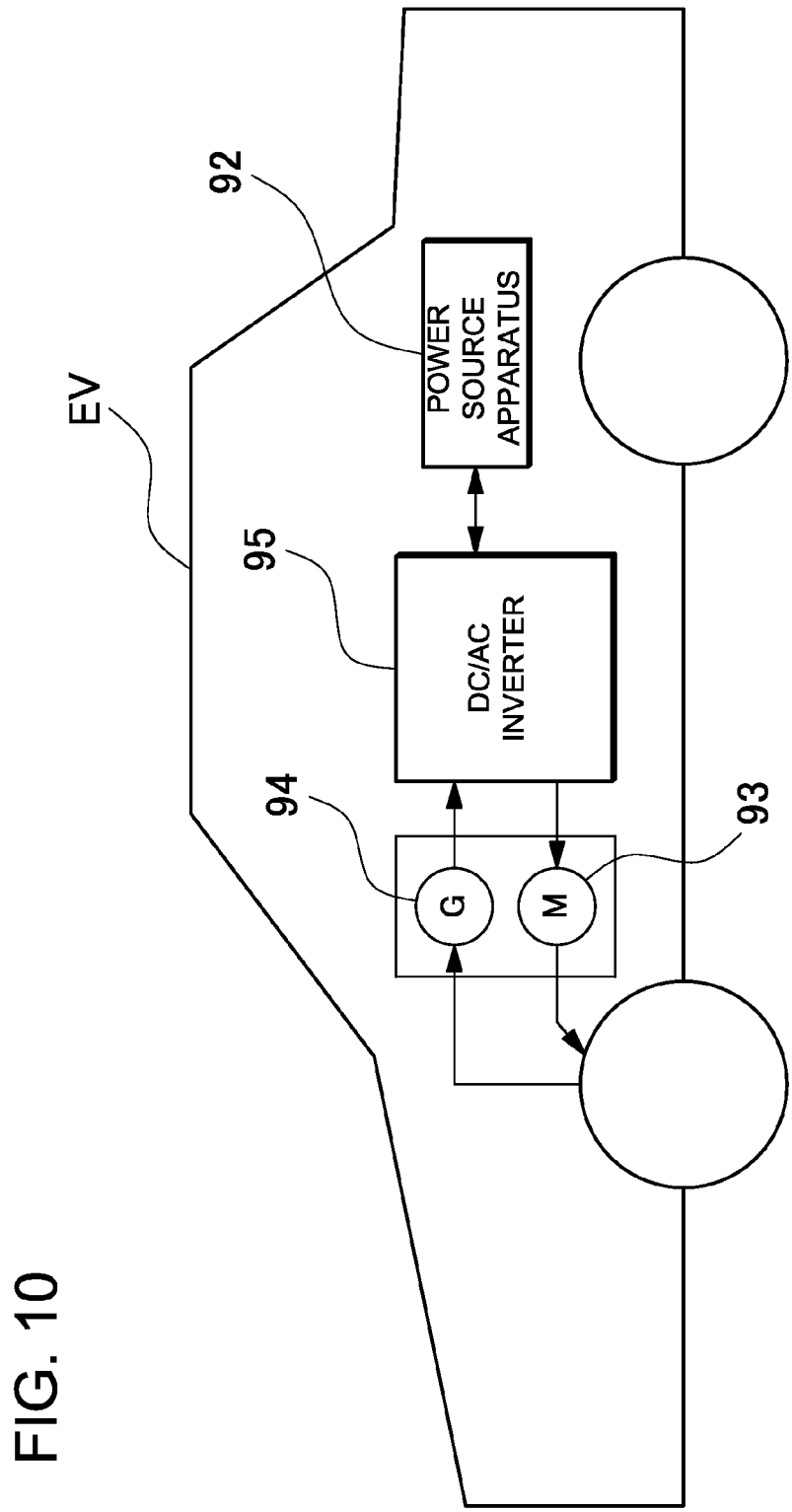
FIG. 10 is a block diagram showing an example of an electric vehicle, which is driven by a motor only, equipped with a battery system.

FIG. 10 shows an example of an automotive battery system installed on-board an electric vehicle EV, which is driven by an electric motor only. The vehicle EV shown in this figure is provided with a driving motor 93 to drive the vehicle EV, a battery system 92 to supply power to the motor 93, and a generator 94 to charge the battery system 92 batteries. The battery system 92 is connected to the motor 93 and generator 94 via a DC/AC inverter 95. The motor 93 operates on power supplied from the battery system 92. The generator 94 is driven by energy from regenerative braking and operates to charge the battery system 92 batteries.

Note the vehicle-side load can also have a voltage converter connected on the input-side of the DC/AC inverter, and power source apparatus output voltage can be boosted for supply to the motor. This type of vehicle-side load boost-converts power source apparatus output voltage to supply power to the motor via the DC/AC inverter, converts generator output to DC through the DC/AC inverter, and steps-down the DC voltage via the voltage converter to charge the driving battery.

(Power Source Apparatus in a Power Storage Application)

Figure 11:
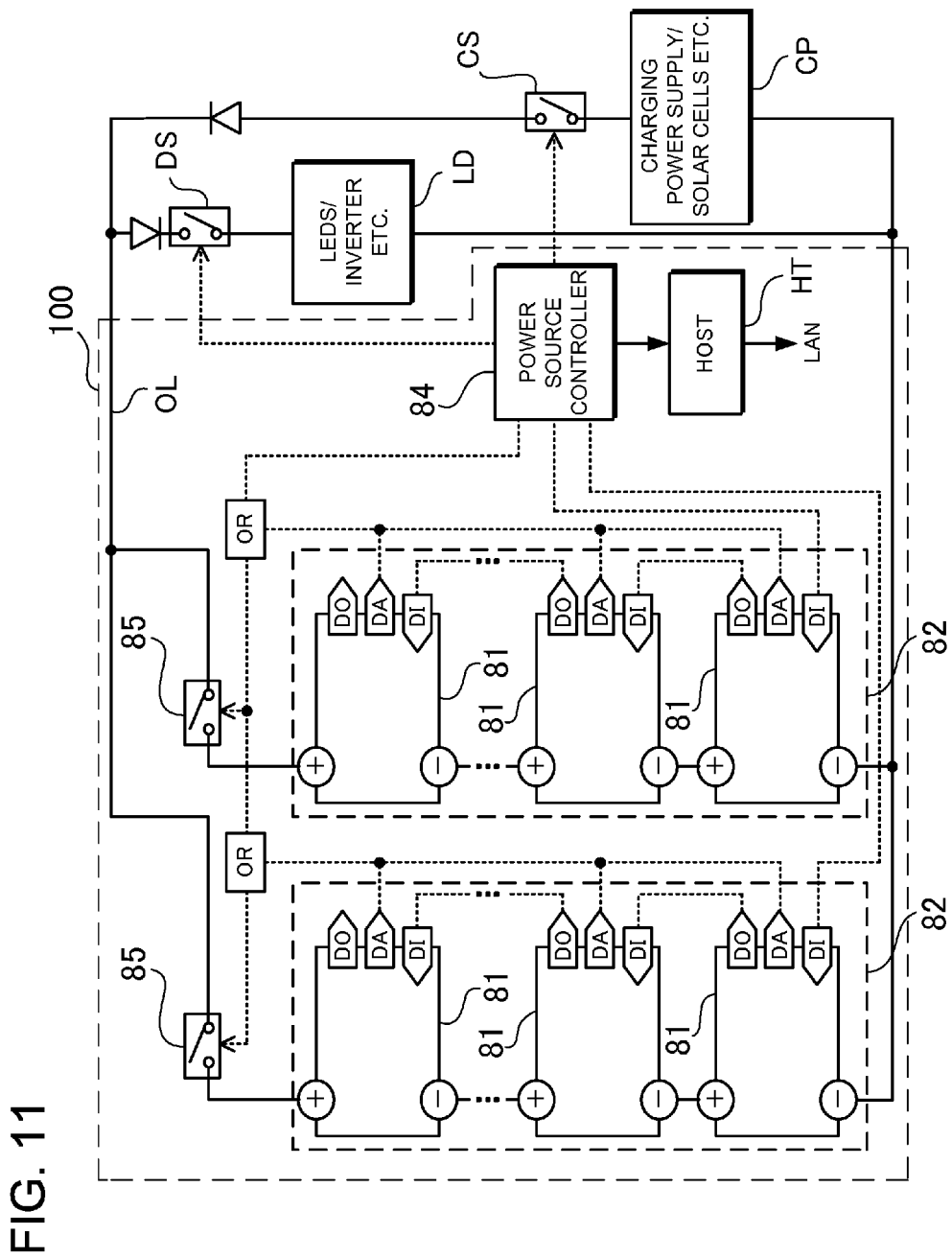
FIG. 11 is a block diagram showing an example of a power source apparatus used in a power storage system application.

The power source apparatus can be used not only as the power source in motor vehicle applications, but also as a power storage system. For example, it can be used as a power source system in the home or manufacturing facility that is charged by solar power or late-night (reduced-rate) power and discharged as required. It can also be used for applications such as a streetlight power source that is charged during the day by solar power and discharged at night, or as a backup power source to operate traffic signals during power outage. An example of a power source apparatus for these types of applications is shown in FIG. 11. The power source apparatus 100 shown in this figure has a plurality of battery packs 81 connected to form battery units 82. Each battery pack 81 has a plurality of battery cells connected in series and/or parallel. Each battery pack 81 is controlled by a power source controller 84. After charging the battery units 82 with a charging power supply CP, the power source apparatus 100 drives a load LD. Accordingly, the power source apparatus 100 has a charging mode and a discharging mode. The load LD and the charging power supply CP are connected to the power source apparatus 100 through a discharge switch DS and a charging switch CS respectively. The discharge switch DS and the charging switch CS are controlled ON and OFF by the power source apparatus 100 power source controller 84. In the charging mode, the power source controller 84 switches the charging switch CS ON and the discharge switch DS OFF to allow the power source apparatus 100 to be charged from the charging power supply CP. When charging is completed by fully-charging the batteries or by charging to a battery capacity at or above a given capacity, the power source apparatus can be switched to the discharging mode depending on demand by the load LD. In the discharging mode, the power source controller 84 switches the charging switch CS OFF and the discharge switch DS ON to allow discharge from the power source apparatus 100 to the load LD. Further, depending on requirements, both the charging switch CS and the discharge switch DS can be turned ON to allow power to be simultaneously supplied to the load LD while charging the power source apparatus 100.

The load LD driven by the power source apparatus 100 is connected through the discharge switch DS. In the discharging mode, the power source controller 84 switches the discharge switch DS ON to connect and drive the load LD with power from the power source apparatus 100. A switching device such as a field effect transistor (FET) can be used as the discharge switch DS. The discharge switch DS is controlled ON and OFF by the power source apparatus 100 power source controller 84. In addition, the power source controller 84 is provided with a communication interface to communicate with externally connected equipment. In the example of FIG. 11, the power source controller 84 is connected to an external host computer HT and communicates via known protocols such as UART and recommended standard-232 (RS-232C) protocols. Further, depending on requirements, a user interface can also be provided to allow direct user operation. Each battery pack 81 is provided with signal terminals and power terminals. The signal terminals include a battery pack input-output terminal DI, a battery pack error output terminal DA, and a battery pack connecting terminal DO. The battery pack input-output terminal DI allows output and input of signals to and from the power source controller 84 and other battery packs. The battery pack connecting terminal DO allows output and input of signals to and from another related battery pack. The battery pack error output terminal DA serves to output battery pack abnormalities to components and devices outside the battery pack. In addition, the power terminals allow the battery packs 81 to be connected in series or parallel. The battery units 82 are connected in parallel to the output line OL via parallel connecting switches 85.

Industrial Applicability

The power source apparatus, vehicle and power storage system using the power source apparatus of the present invention can be appropriately used as a power source apparatus in a vehicle such as a plug-in hybrid electric vehicle that can switch between an electric vehicle mode and a hybrid vehicle mode, a hybrid (electric) vehicle, and an electric vehicle.

REFERENCE SIGNS LIST 100, 200, 300, 400, 500 POWER SOURCE APPARATUS
1 MODULE ASSEMBLY
2 MAIN CONTROLLER
3 CONNECTING SECTION
4 CURRENT DETECTION SECTION
5 HUB CONTROLLER
10 MODULE
11 BATTERY CELL
12 BATTERY BLOCK
13 EQUALIZING CIRCUIT
14 BATTERY STATE DETECTION SECTION
16, 16A, 16B COMMUNICATION INTERFACE UNIT
18 MEMORY SECTION
20 CIRCUIT BOARD
21 VOLTAGE DETECTION SECTION
22 TEMPERATURE DETECTION SECTION
23 TEMPERATURE SENSOR
24 ENDPLATE
25 BASE-PLATE
26 PROJECTION
30 BINDING BAR

31 BENT REGION
32 SLIT
40 SEPARATOR
81 BATTERY PACK
82 BATTERY UNIT
84 POWER SOURCE CONTROLLER
85 PARALLEL CONNECTING SWITCH
91, 92 POWER SOURCE APPARATUS
93 MOTOR
94 GENERATOR
95 DC/AC INVERTER
96 ENGINE
97 VEHICLE-SIDE CONTROLLER
98 CONTACTOR RELAY UNIT
99 SERVICE PLUG
CB COMMUNICATION LINE
CCB COMMON COMMUNICATION LINE
OL OUTPUT LINE
CL CURRENT SIGNAL LINE
HV HYBRID VEHICLE
EV ELECTRIC VEHICLE
LD LOAD
CP CHARGING POWER SUPPLY
DS DISCHARGE SWITCH
CS CHARGING SWITCH
HT HOST COMPUTER
DI BATTERY PACK INPUT-OUTPUT TERMINAL
DA BATTERY PACK ERROR OUTPUT TERMINAL
DO BATTERY PACK CONNECTING TERMINAL

The invention claimed is:

1. A power source apparatus comprising:
a plurality of modules;
a main controller connected to the plurality of modules to control said modules; and
a current detection section to detect output line current flow,
wherein each module comprises:
 a battery block having a plurality of battery cells stacked together and connected in series and/or parallel;
 a battery state detection section that detects the state of the battery cells; and
 communication interface units for data communication with other modules and the main controller,
wherein the main controller is connected to the communication interface units of the modules via communication lines,
wherein the plurality of modules are connected in series and/or parallel with the output line,
wherein the current detection section is connected to the main controller via a signal line, and
wherein the main controller can perform computations based on data sent from the modules via the communication lines and/or information related to output current sent from the current detection section via the signal line.

2. The power source apparatus as cited in claim 1 wherein each module comprises a memory section capable of storing data transmitted through the communication interface units.

3. The power source apparatus as cited in claim 2 wherein each module enables the memory section to be over-written based on signals from the main controller.

4. The power source apparatus as cited in claim 1 wherein the modules are connected in series with the output line.

5. The power source apparatus as cited in claim 1 wherein the main controller and plurality of modules are connected via communication lines in any of the network topologies including a bus topology, daisy-chain topology, ring topology, or star topology.

6. The power source apparatus as cited in claim 1 wherein each module comprises a plurality of communication interface units, one communication interface unit can be connected with a module on the upstream-side, and another communication interface unit can be connected with a module on the downstream-side.

7. The power source apparatus as cited in claim 1 wherein each module comprises an equalizing circuit to equalize the remaining capacities of the plurality of battery cells that make up the battery block included in the module; and each module equalizes battery cell remaining capacity using the equalizing circuit upon receipt of instruction from the main controller.

8. The power source apparatus as cited in claim 1 wherein the battery state detection section comprises a voltage detection section to detect battery cell voltage.

9. The power source apparatus as cited in claim 1 wherein the battery state detection section comprises a temperature detection section to detect battery cell temperature.

10. The power source apparatus as cited in claim 8 wherein each module is configured to allow transmission of information related to the voltage of battery cells in that module to the main controller via the communication interface units.

11. The power source apparatus as cited in claim 1 wherein the main controller detects connection of each module to communication lines and has the capability to allocate a unique address to each module; each module can store its allocated unique address in the memory section; and system architecture allows data communication between the main controller and each module based on the unique address stored in the memory section.

12. A vehicle equipped with the power source apparatus cited in claim 1.

13. A power storage system using the power source apparatus cited in claim 1.

* * * * *